(12) United States Patent
Ng et al.

(10) Patent No.: US 9,394,453 B2
(45) Date of Patent: Jul. 19, 2016

(54) WHITE INKJET INK

(71) Applicant: Hewlett-Packard Development Company, L.P., Houston, TX (US)

(72) Inventors: Hou T. Ng, Campbell, CA (US); Howard S. Tom, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/892,560

(22) PCT Filed: May 30, 2013

(86) PCT No.: PCT/US2013/043369
§ 371 (c)(1),
(2) Date: Nov. 19, 2015

(87) PCT Pub. No.: WO2014/193387
PCT Pub. Date: Dec. 4, 2014

(65) Prior Publication Data
US 2016/0102217 A1  Apr. 14, 2016

(51) Int. Cl.
| | |
|---|---|
| C09D 11/322 | (2014.01) |
| C09D 11/38 | (2014.01) |
| C09D 11/106 | (2014.01) |
| C09D 121/02 | (2006.01) |
| B41J 2/21 | (2006.01) |
| C08K 3/26 | (2006.01) |

(52) U.S. Cl.
CPC ............ *C09D 11/322* (2013.01); *C09D 11/106* (2013.01); *C09D 11/38* (2013.01); *C09D 121/02* (2013.01); *B41J 2/211* (2013.01); *B41J 2/2114* (2013.01); *B41J 2/2117* (2013.01); *C08K 3/26* (2013.01); *C08K 2003/265* (2013.01)

(58) Field of Classification Search
None
See application file for complete search history.

(56) References Cited

U.S. PATENT DOCUMENTS

| | | |
|---|---|---|
| 6,800,123 B2 | 10/2004 | Arakawa |
| 7,897,656 B2 | 3/2011 | Nakamura et al. |
| 8,114,487 B2 | 2/2012 | Schultz et al. |
| 8,304,043 B2 | 11/2012 | Nagashima et al. |
| 8,430,475 B2 | 4/2013 | Kabalnov et al. |
| 2004/0110868 A1 | 6/2004 | Zhu et al. |
| 2007/0071965 A1 | 3/2007 | Ramsey |
| 2010/0279035 A1 | 11/2010 | Namba et al. |
| 2010/0302300 A1 | 12/2010 | Verdonck |

FOREIGN PATENT DOCUMENTS

| | | | |
|---|---|---|---|
| CN | 102925002 | 2/2013 | |
| JP | 2005298802 | 10/2005 | |
| JP | 2008156649 | 7/2008 | |
| WO | WO 2014147373 A3 * | 2/2015 | ............ C09D 11/10 |

\* cited by examiner

*Primary Examiner* — Lisa M Solomon
(74) *Attorney, Agent, or Firm* — Dierker & Kavanaugh, P.C.

(57) ABSTRACT

A white inkjet ink includes an anionic surfactant having a molecular weight less than 10,000, a white pigment, a latex particle, and a balance of water. The white pigment has i) a density less than 3 g/cm$^3$, and ii) a substantially constant particle size over a predetermined time period. The substantially constant particle size ranges from about 100 nm to about 300 nm.

15 Claims, 2 Drawing Sheets

WHITE INKJET INK

BACKGROUND

In addition to home and office usage, inkjet technology has been expanded to high-speed, commercial and industrial printing. Inkjet printing is a non-impact printing method that utilizes electronic signals to control and direct droplets or a stream of ink to be deposited on media. Some commercial and industrial inkjet printers utilize fixed printheads and a moving substrate web in order to achieve high speed printing. Current inkjet printing technology involves forcing the ink drops through small nozzles by thermal ejection, piezoelectric pressure or oscillation onto the surface of the media. This technology has become a popular way of recording images on various media surfaces (e.g., paper), for a number of reasons, including, low printer noise, capability of high-speed recording and multi-color recording.

BRIEF DESCRIPTION OF THE DRAWINGS

Features and advantages of examples of the present disclosure will become apparent by reference to the following detailed description and the drawings, in which like reference numerals correspond to similar, though perhaps not identical, components. For the sake of brevity, reference numerals or features having a previously described function may or may not be described in connection with other drawings in which they appear.

DETAILED DESCRIPTION

Some water-based white inks used in inkjet printing have been found to suffer from dispersion instability. It is believed that dispersion instability may be due to aggregation and/or sedimentation of the white pigment that is used. As an example, white inks containing titanium dioxide particles may exhibit instability. The stability may be increased when titanium dioxide particles of a smaller size (e.g., sub-50 nm) are utilized; however, smaller particles may also result in an undesirable reduction in opacity of the white ink.

Examples of the white inkjet ink disclosed herein exhibit stability. By "stability", it is meant that the white pigment particles experience little, if any, aggregation (i.e., the particle size of the white pigment remains substantially consistent for a predetermined time) and sedimentation. Without being bound to any theory, it is believed that the material system used in the white inkjet ink creates repulsion (e.g., electrostatic repulsion) between the pigment particles in the dispersion environment. This material system includes a low density (i.e., less than 3 g/cm$^3$) white pigment and an anionic surfactant having a molecular weight (number average) less than 10,000. It is believed that the anionic surfactant interacts with surface group(s) (e.g., a hydroxyl group) of the white pigment in such a manner that the negatively charged anionic groups face away from the surface of the white pigment particle. The positioning of the negatively charged anionic groups causes the white pigment particles to repel one another, thereby avoiding agglomeration or aggregation into larger pigment specks. The low density of the white pigment particles is believed to contribute to the reduction in sedimentation.

Examples of the white inkjet ink disclosed herein also exhibit a desirable white opacity (i.e., at least 50%). This percentage of opacity may be achieved by including a suitable white pigment loading as well as a latex particle. The latex particle affects the reflective intensity of the white inkjet ink by acting as an optical spacer. The latex particles act as spacers between the white pigments, facilitating a larger change in refractive index between the pigments and the latex. This leads to enhanced light scattering and higher opacity.

The white inkjet ink disclosed herein is an aqueous based ink including the white pigment, the anionic surfactant, the latex particle, and a balance of water. In some instances, the white inkjet ink includes no other components. In other instances, the white inkjet ink includes additives, such as an optical brightener, a biocide, another surfactant, a co-solvent, and/or a humectant. The various components of examples of the white inkjet will be described further in reference to FIG. 1, which illustrates an example of a method 10 for making the white inkjet ink.

Figure 1:
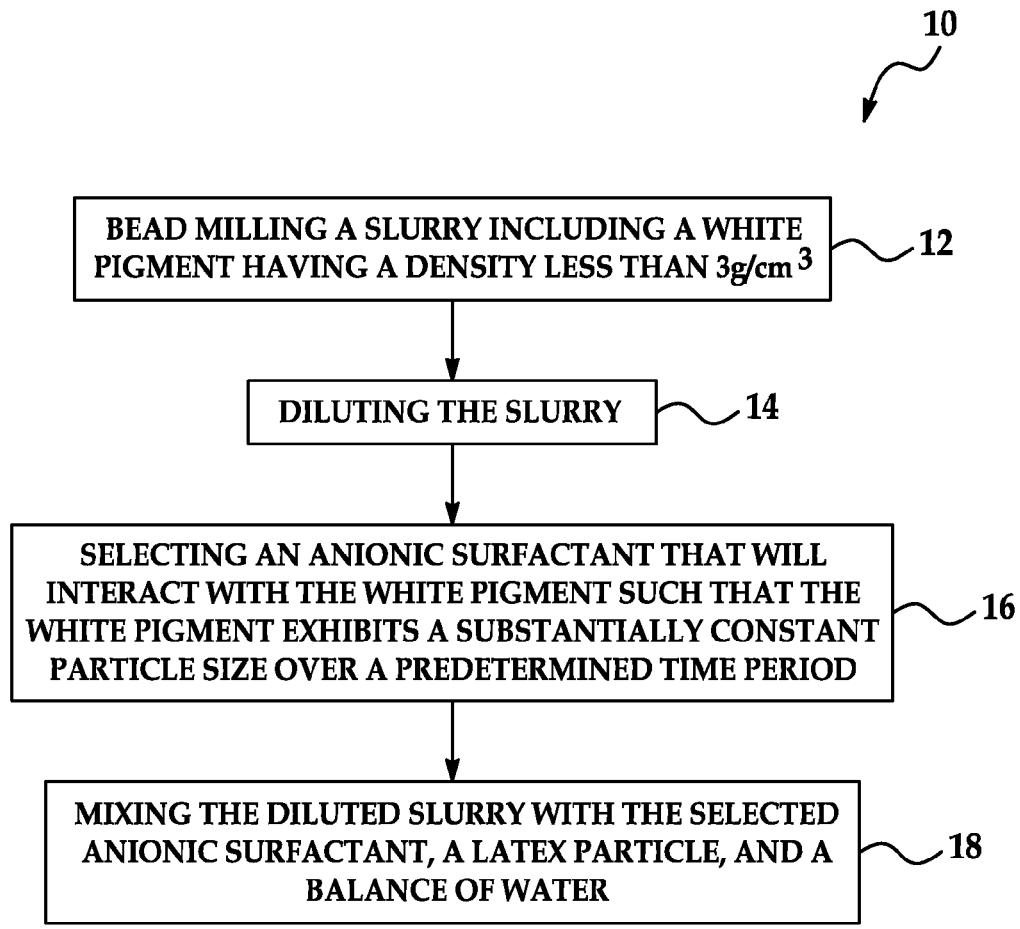
FIG. 1 is a flow diagram illustrating an example of a method of making an example of a white inkjet ink.

As illustrated in FIG. 1, the method 10 begins with a bead milling process (reference numeral 12). This process is performed in order to obtain white pigment particles having an average size that is suitable for obtaining white opacity and for achieving good jettability. In an example, the desired average particle size for the white pigment particles ranges from about 200 nm to about 300 nm.

Prior to bead milling, the white pigment particles may be in the form of agglomerates having an average particle size that is greater than 300 nm. In an example, the particle agglomerates may be larger than 0.5 μm. The white pigment is selected from a class of white filler pigments that have an effective density that is less than 3 g/cm$^3$. Examples of the white pigment include precipitated calcium carbonate (PCC), aluminum silicate, aluminum oxide (i.e., alumina), mica-based pigments coated with thin layer(s) of white pigment (such as $TiO_2$), or combinations thereof.

In the bead milling process, a slurry of water and the selected white pigment is prepared. In an example, the slurry includes about 25 wt % of the white pigment particles and a remaining balance of water. The slurry may contain from about 10 wt % to about 50 wt % of the white pigment particles.

The slurry is mixed with milling media, and this mixture is added to a bead mill, an attritor, or another type of particle size reduction equipment. One example of a bead mill is a UAM015 bead mill from Kotobuki Industries, Japan. In an example, 100 μm zirconium oxide ($ZrO_2$) beads are used as the milling media. The ratio of the slurry to the milling media may range from about 2:3 (v/v) to about 3:1 (v/v).

Bead milling is then accomplished using suitable conditions (e.g., speed, temperature, etc.) for a suitable time to achieve the desired reduced particle size. In an example, the speed may be about 3,000 rpm, and the temperature may range from about 10° C. to about 80° C. In one example, milling may be accomplished for about 5 minutes to about 60 minutes per cycle. In an example, the milling cycle is about 30 minutes. The number of cycles utilized may depend, at least in part, on the original size and the desirable reduced size of the white pigment particles. In an example, anywhere from one cycle to four cycles are performed. This process causes the original white pigment particles/agglomerates to deagglomerate into discrete particles. For instance, during bead milling, the impact from the milling media disintegrates the pigment agglomerates into the discrete particles, which have an average pigment particle size at or below 300 nm.

During the bead milling process, the particle size may be monitored, e.g., via dynamic light scattering (DLS) and/or scanning electron microscopy (SEM).

After bead milling is complete, the milling media is separated from the white pigment particles using, for example, a mesh sieve or some other suitable filter.

As shown at reference numeral 14 in FIG. 1, the slurry (now including the reduced size white pigment particles) is diluted with water. In an example, the slurry is diluted to contain about 5 wt % of the white pigment particles. The diluted slurry may include anywhere from about 5 wt % to about 30 wt % of the white pigment particles.

An anionic surfactant is then selected for the white inkjet ink, as shown at reference numeral 16. As previously mentioned, the anionic surfactant is selected so that it interacts with the white pigment in a desirable manner. More particularly, the anionic surfactant is selected so that when the anionic surfactant is mixed with the white pigment particles, the surfactant will migrate toward the discrete pigment particles, and attach themselves onto the surfaces thereof (via physisorption and/or chemisorption). It is believed that the anionic groups of the surfactant orient themselves so that the negative charges are facing away from the pigment particle surface. It is further believed that this creates repulsive forces within the ink environment that keep the particles from agglomerating. This enables the white pigment particles to maintain a substantially constant particle size over time.

By "substantially consistent particle size", it is meant that the average particle size of the white pigment particles (after the reduction in size takes place and after incorporation into the inkjet ink) remains within a predetermined range or below a predetermined number for a predetermined period of time. In an example, the particle size stays within the range of from about 100 nm to about 250 nm. In another example, about 90% of the particles remain substantially consistent in size. The predetermined time period may be at least 3 months at ambient conditions (e.g., a temperature ranging from about 20° C. to about 25° C.). In still another example, after the white pigment particles are incorporated into the white inkjet ink, the particle size of the white pigment particles stays below 300 nm or within a range of 200 nm to 300 nm for at least 6 days.

Examples of suitable anionic surfactants have a molecular weight that is less than 10,000. Some particular examples of the anionic surfactant include a 50% active alkylphenol ethoxylate-free polymeric dispersant in water (e.g., SOLSPERSE® 46000 from Lubrizol, Ltd., United Kingdom) and sodium dodecyl sulfate (SDS).

Once the anionic surfactant is selected, the white inkjet ink is then prepared by mixing the diluted slurry with the anionic surfactant, a latex particle, and a balance of water. This is shown at reference numeral 18 in FIG. 1. The anionic surfactant, the latex particle, any other additives, and water may be added sequentially to the diluted slurry after milling to afford the final dispersion. Alternatively, the components may be added and processed via another mixing process, such ultrasonication, low-shear mixing, etc.

The amount of anionic surfactant utilized will depend, at least in part, on the amount of white pigment particles that is utilized. In an example, the anionic surfactant is present in an amount up to 20% of an amount of the white pigment. In an example, the anionic surfactant is present in an amount up to 10% of an amount of the white pigment. In the example including 5 wt % of white pigment particles, up to 0.5 wt % of the anionic surfactant may be included.

As mentioned above, the latex particle enhances the opacity of the white inkjet ink by acting as an optical spacer. Optical spacers enhance reflective intensity, which in turn enhances the opacity. Suitable latex particles include polyurethane-based particles, styrene based particles, and methacrylic based latex particles. The average particle size of the latex particles is less than 200 nm. In an example, the average particle size of the latex particles ranges from about 100 nm to about 200 nm. The latex particles may be present in the white inkjet ink in an amount ranging from about 2 wt % with respect to the pigment wt % to about 50 wt % with respect to the pigment wt %. The higher amounts may be incorporated to further increase the opacity.

The white inkjet ink may, in some examples, include other additives, such as an optical brightener. The optical brightener may further enhance the opacity of the ink. Examples of suitable optical brighteners include benzoxazolines, biphenyl-stilbenes, triazoles, diazoles, imidazolines, coumarins, and triazine-stilbenes. The optical brightener may range from about 0.5 wt % to about 5 wt % of the total wt % of the ink.

As mentioned above, other suitable additives include a biocide, another surfactant, a co-solvent, and/or a humectant. The biocide may be used in any amount that is less than 1 wt % of the total wt % of the ink. Examples of the other surfactants include TERGITOL™ (The Dow Chemical Co.), ZONYL® FSO (E. I. du Pont de Nemours and Company), CRODAFOS™ (Croda International), SURFYNOL® (Air Products and Chemicals). The surfactant may be used in any amount that is less than 5 wt % of the total wt % of the ink. The co-solvent is included in addition to water, and may be used in any amount that is less than 20 wt % of the total wt % of the ink. Examples of suitable co-solvents include propanol and its variants. The humectant may be used in an amount that is less than 15 wt % of the total wt % of the ink. An example humectant is DANTOCOL® DHE (di-(2-hydroxyethyl)-5,5-dimethylhydantoin) (Lonza).

The amount of water included makes up the balance of the ink.

The white inkjet inks disclosed herein are printable from a thermal inkjet printhead, such as 10 ng to 40 ng thermal inkjet pens. The white ink may also be printed with piezoelectric printheads. The printing method involves jetting the white inkjet ink onto a suitable substrate, such as colored cellulose-based substrates, plastics, glass, foils, etc. As will be illustrated in the Example section below, examples of the white inkjet ink disclosed herein are capable of being thermally jetted in a reliable manner at a relatively high drop velocity, with desirable directionality and nozzle health.

To further illustrate the present disclosure, examples are given herein. It is to be understood that these examples are provided for illustrative purposes and are not to be construed as limiting the scope of the present disclosure.

EXAMPLE

Six white milled dispersions were prepared by ball milling the white pigments in the presence of various surfactants, and then diluting with water. Table 1 below illustrates the formulations of the various dispersions. In the dispersion formulations, the white pigment was precipitated calcium carbonate (PCC) particles in the form of a slurry.

TABLE 1

| Dispersion Samples | White Pigment (wt %) | Surfactant (wt %) | Water |
|---|---|---|---|
| White Dispersion 0 (comparative) | PCC slurry (5 wt % solids) | None | Balance to 100 wt % |
| White Dispersion 1 (comparative) | PCC slurry (5 wt % solids) | TRITON ™ X-100* (0.5 wt %) | Balance to 100 wt % |
| White Dispersion 2 | PCC slurry (5 wt % solids) | Sodium dodecyl sulfate (0.5 wt %) | Balance to 100 wt % |
| White Dispersion 3 (comparative) | PCC slurry (5 wt % solids) | TERGITOL ™ XD** (0.5 wt %) | Balance to 100 wt % |
| White Dispersion 4 (comparative) | PCC slurry (5 wt % solids) | SOLSPERSE ® 27000*** (0.5 wt %) | Balance to 100 wt % |
| White Dispersion 5 | PCC slurry (5 wt % solids) | SOLSPERSE ® 46000**** (0.5 wt %) | Balance to 100 wt % |

Figure 2:
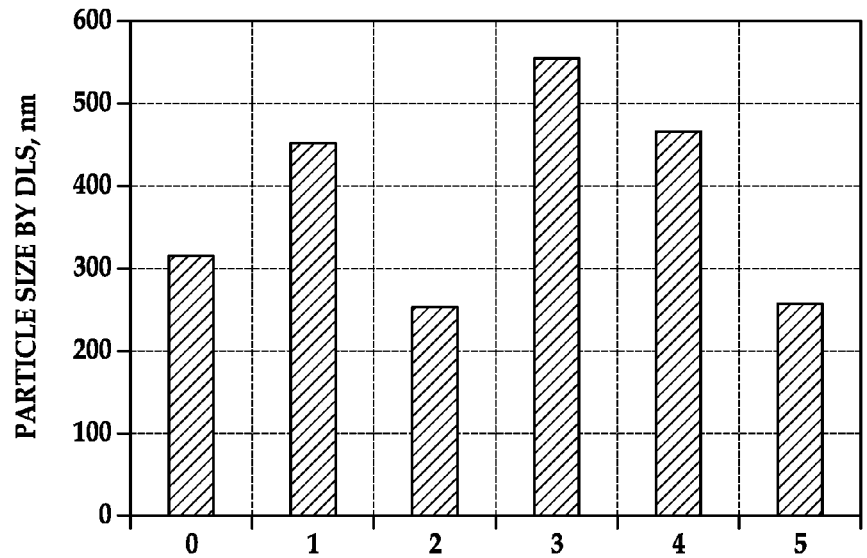
FIG. 2 is a graph illustrating the particle size of white pigments ground with a variety of different surfactants.
Figure 3:
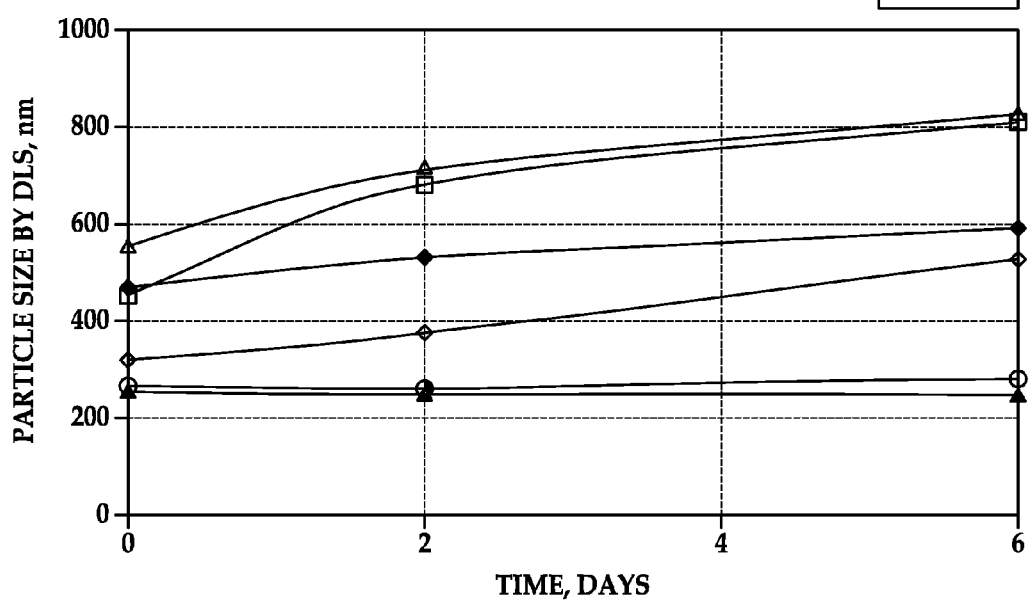
FIG. 3 is a graph illustrating the pigment aggregation stability of the white pigments.

*a nonionic, octylphenol ethoxylate surfactant, available from The Dow Chemical Co., Midland, MI
**a nonionic alkyl EO/PO copolymer surfactant, available from The Dow Chemical Co., Midland, MI
***a nonionic, 100% active polymeric dispersion, available from Lubrizol, Ltd., United Kingdom
****an anionic, 50% active polymeric dispersant in water, available from Lubrizol, Ltd., United Kingdom After the dispersions were prepared, the average particle size of the white pigment in each of the white dispersion samples was determined by dynamic light scattering (DLS). The results are shown in FIG. 2. As illustrated, both white dispersions 2 and 5 had an average particle size of about 250 nm, while comparative white inks 0, 1, 3, and 4 each had an average particle size over 300 nm. The dispersions were then allowed to sit for 6 days. The particle size was measured using DLS after 2 days, 4 days, and 6 days. These results are shown in FIG. 3. As illustrated, the particle size of the white dispersions 2 and 5 remains at about 250 nm over the time period, with very little change. In contrast, the particle size in comparative white dispersion 0 increased by about 200 nm; the particle size in comparative white dispersion 1 increased by about 350 nm; the particle size in comparative dispersion 3 increased in size by about 250 nm; and the particle size in comparative dispersion 4 increased in size by about 125 nm. The increase in particle size in each of the comparative dispersions is indicative of pigment particle aggregation. In contrast, both white dispersions 2 and 5 exhibited pigment aggregation stability.

The jetting performance of white dispersion samples 2 and 5 was evaluated using an HP thermal printhead. Typical firing conditions were utilized, as shown in Tables 2 and 3 below.

TABLE 2

Jetting Conditions/Performance for White Dispersion 2

| Voltage | Pulse Width (μs) | Energy (μJ) | Temperature (° C.) | Drop Velocity (m/s) |
|---|---|---|---|---|
| 18 | 2.0 | 1.7 | 35 | 10.4 |
| 20 | 1.8 | 1.9 | 35 | 11.9 |
| 20 | 2.0 | 2.1 | 35 | 12.8 |
| 20 | 2.2 | 2.3 | 35 | 12.5 |
| 22 | 2.0 | 2.6 | 35 | 12.0 |
| | | | Average | 11.92 |

TABLE 3

Jetting Conditions/Performance for White Dispersion 5

| Voltage | Pulse Width (μs) | Energy (μJ) | Temperature (° C.) | Drop Velocity (m/s) |
|---|---|---|---|---|
| 20 | 1.8 | 1.9 | 35 | 9.3 |
| 20 | 2.0 | 2.1 | 35 | 11.6 |
| 22 | 1.6 | 2.2 | 35 | 12.9 |
| 22 | 1.8 | 2.4 | 35 | 14.7 |
| 22 | 2.0 | 2.6 | 35 | 14.0 |
| | | | Average | 12.5 |

As depicted in Tables 2 and 3, the average drop velocity was desirable (>10 m/s) for both white dispersions 2 and 5. It was also observed that these dispersions exhibited relatively good decap performance (the term "decap," as referred to herein, means the ability of the dispersion composition to readily eject from the print head, upon prolonged exposure to air), and an absence of nozzle plate puddling with extended firing.

It is to be understood that the ranges provided herein include the stated range and any value or sub-range within the stated range. For example, a range from about 0.5 wt. % to about 5 wt. % should be interpreted to include not only the explicitly recited limits of about 0.5 wt. % to about 5 wt. %, but also to include individual values, such as 0.75 wt. %, 3 wt. %, 4.5 wt. %, etc., and sub-ranges, such as from about 0.8 wt. % to about 4 wt. %, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

While several examples have been described in detail, it will be apparent to those skilled in the art that the disclosed examples may be modified. Therefore, the foregoing description is to be considered non-limiting.

What is claimed is:

1. A white inkjet ink, comprising:
an anionic surfactant having a molecular weight less than 10,000;
a white pigment having i) a density less than 3 g/cm$^3$, and ii) a substantially constant particle size over a predetermined time period, the substantially constant particle size ranging from about 100 nm to about 300 nm;
a latex particle; and
a balance of water.

2. The white inkjet ink as defined in claim 1 wherein the predetermined time period is at least 3 months at ambient temperature.

3. The white inkjet ink as defined in claim 1 wherein the anionic surfactant is selected from a 50% active alkylphenol ethoxylate-free polymeric dispersant in water and sodium dodecyl sulfate.

4. The white inkjet ink as defined in claim 3 wherein the anionic surfactant is present in an amount up to 20% of an amount of the white pigment.

5. The white inkjet ink as defined in claim 1 wherein the white pigment is present in an amount ranging from about 5 wt % to about 30 wt % of a total wt % of the inkjet ink.

6. The white inkjet ink as defined in claim 1 wherein the white pigment is selected from precipitated calcium carbonate, aluminum silicate, aluminum oxide, a mica pigment coated with titanium dioxide, and combinations thereof.

7. The white inkjet ink as defined in claim 1 wherein an amount of the latex particle ranges from about 2 wt % with respect to white pigment wt % to about 50 wt % with respect to white pigment wt %.

8. The white inkjet ink as defined in claim 1, further comprising an optical brightener.

9. A method of making a white inkjet ink, the method comprising:
  bead milling a slurry including about 25 wt % of a white pigment having a density less than 3 g/cm$^3$;
  diluting the slurry to include about 5 wt % of the white pigment;
  selecting an anionic surfactant that will interact with the white pigment such that the white pigment exhibits, in the white inkjet ink, a substantially constant particle size over a predetermined time period, the substantially constant particle size ranging from about 100 nm to about 300 nm; and
  mixing the diluted slurry with the selected anionic surfactant, a latex particle, and a balance of water.

10. The method as defined in claim 9 wherein the selecting of the anionic surfactant includes selecting the anionic surfactant from a 50% active alkylphenol ethoxylate-free polymeric dispersant in water and sodium dodecyl sulfate.

11. The method as defined in claim 9, further comprising increasing an opacity of the white inkjet ink by any of:
  increasing an amount of the latex particle included in the white inkjet ink; or
  introducing an optical brightener into the white inkjet ink.

12. The method as defined in claim 9 wherein bead milling is accomplished at a predetermined speed for a predetermined time to reduce an initial size of the white pigment to the substantially constant particle size.

13. A printing method, comprising:
  selecting a white inkjet ink, including:
    an anionic surfactant having a molecular weight less than 10,000;
    a white pigment having i) a density less than 3 g/cm$^3$, and ii) a substantially constant particle size over a predetermined time period, the substantially constant particle size ranging from about 100 nm to about 300 nm;
    a latex particle; and
    a balance of water; and
  thermal inkjet printing the white inkjet ink onto a medium.

14. The printing method as defined in claim 13 wherein the anionic surfactant is sodium dodecyl sulfate, and wherein the printing method further comprises performing the thermal inkjet printing using a jetting condition selected from:
  a voltage ranging from about 18 V to about 22 V;
  a pulse width ranging from about 1.8 µs to about 2.2 µs;
  an energy ranging from about 1.7 µJ to about 2.6 µJ; and
  a temperature of about 35° C.

15. The printing method as defined in claim 13 wherein the anionic surfactant is a 50% active alkylphenol ethoxylate-free polymeric dispersant in water, and wherein the printing method further comprises performing the thermal inkjet printing using a jetting condition selected from:
  a voltage ranging from about 20 V to about 22 V;
  a pulse width ranging from about 1.6 µs to about 2.0 µs;
  an energy ranging from about 1.9 µJ to about 2.6 µJ; and
  a temperature of about 35° C.

* * * * *